(12) United States Patent
Spadacini et al.

(10) Patent No.: US 10,875,132 B2
(45) Date of Patent: Dec. 29, 2020

(54) METHOD FOR MANUFACTURING BLADED RINGS FOR RADIAL TURBOMACHINES AND BLADED RING OBTAINED BY THIS METHOD

(71) Applicant: EXERGY S.P.A., Bologna (IT)

(72) Inventors: Claudio Spadacini, Verbania Suna (IT); Dario Rizzi, Bisuschio (IT)

(73) Assignee: EXERGY S.P.A., Bologna (IT)

( * ) Notice: Subject to any disclaimer, the term of this patent is extended or adjusted under 35 U.S.C. 154(b) by 162 days.

(21) Appl. No.: 16/079,480

(22) PCT Filed: Feb. 13, 2017

(86) PCT No.: PCT/IB2017/050785
§ 371 (c)(1),
(2) Date: Aug. 23, 2018

(87) PCT Pub. No.: WO2017/149400
PCT Pub. Date: Sep. 8, 2017

(65) Prior Publication Data
US 2019/0047095 A1      Feb. 14, 2019

(30) Foreign Application Priority Data

Feb. 29, 2016   (IT) .................. 102016000021071

(51) Int. Cl.
| | |
|---|---|
| *B23H 9/10* | (2006.01) |
| *B23C 3/18* | (2006.01) |
| *F01D 5/04* | (2006.01) |
| *B23P 15/00* | (2006.01) |

(52) U.S. Cl.
CPC .............. *B23P 15/006* (2013.01); *B23C 3/18* (2013.01); *B23H 9/10* (2013.01); *F01D 5/041* (2013.01);
(Continued)

(58) Field of Classification Search
CPC . B23P 15/006; B23H 9/10; B23C 3/18; B23C 2215/44; F01D 5/041;
(Continued)

(56) References Cited

U.S. PATENT DOCUMENTS

| | | |
|---|---|---|
| 911,663 A | 2/1909 | Ljungstrom |
| 933,379 A | 9/1909 | Ljungstrom |

(Continued)

FOREIGN PATENT DOCUMENTS

| | | |
|---|---|---|
| EP | 0353856 A1 | 2/1990 |
| EP | 1502682 A1 | 2/2005 |

(Continued)

OTHER PUBLICATIONS

May 30, 2017 International Search Report issued in International Patent Application No. PCT/IB2017/050785.
(Continued)

*Primary Examiner* — Lee A Holly
(74) *Attorney, Agent, or Firm* — Oliff PLC

(57) ABSTRACT

A method for the construction of bladed rings for radial turbomachines, including: preparing an annular block; roughing the annular block by removing material to define a first, second, third and fourth axial section, wherein the first axial section defines a reinforcement ring, wherein the third axial section defines a base ring; roughing the second axial section by removing material to delimit a plurality of separate elements, wherein the separate elements axially connect the base ring to the reinforcement ring; finishing each of the separate elements by removing material to provide the separate element with the shape of an airfoil blade, wherein a leading edge of the blade and a trailing edge of the blade develop substantially parallel to a central axis of the bladed ring; roughing the fourth axial section by remov- (Continued)

ing material for delimiting an annular anchoring appendage of the base ring to a radial turbomachine.

13 Claims, 6 Drawing Sheets

(52) U.S. Cl.
CPC ...... *B23C 2215/44* (2013.01); *F05D 2230/11* (2013.01); *F05D 2230/12* (2013.01); *F05D 2230/61* (2013.01)

(58) Field of Classification Search
CPC ............. F05D 2230/11; F05D 2230/12; F05D 2230/61; B22F 5/009; B22F 3/15; B23F 21/128
See application file for complete search history.

(56) References Cited

U.S. PATENT DOCUMENTS

| | | |
|---|---|---|
| 968,862 A | 8/1910 | Ljungstrom |
| 1,831,104 A | 11/1931 | Eriksson et al. |
| 5,438,755 A * | 8/1995 | Giberson ............. B23P 15/006 29/558 |
| 6,942,460 B2 | 9/2005 | Osako et al. |
| 2009/0110556 A1* | 4/2009 | Jahnz ................... F04D 29/023 416/179 |
| 2012/0003058 A1* | 1/2012 | Hutter .................. B23F 21/128 409/26 |
| 2015/0267543 A1* | 9/2015 | Gerber ................. F04D 29/023 416/212 R |

FOREIGN PATENT DOCUMENTS

| | | |
|---|---|---|
| GB | 652591 A | 4/1951 |
| RU | 2482940 C1 | 5/2013 |
| WO | 2014/064567 A1 | 5/2014 |

OTHER PUBLICATIONS

May 30, 2017 Written Opinion issued in International Patent Application No. PCT/IB2017/050785.

* cited by examiner

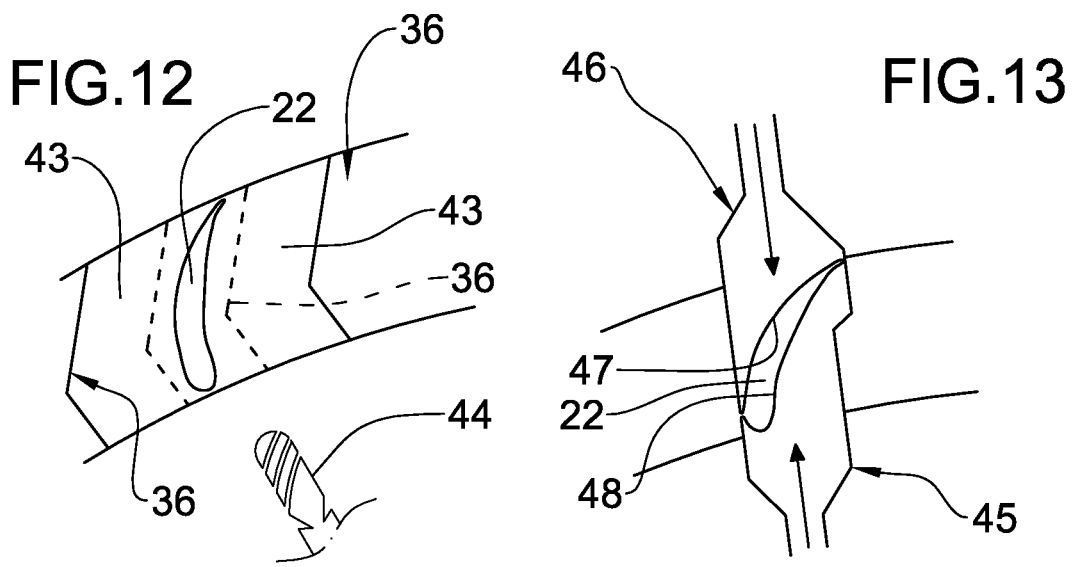
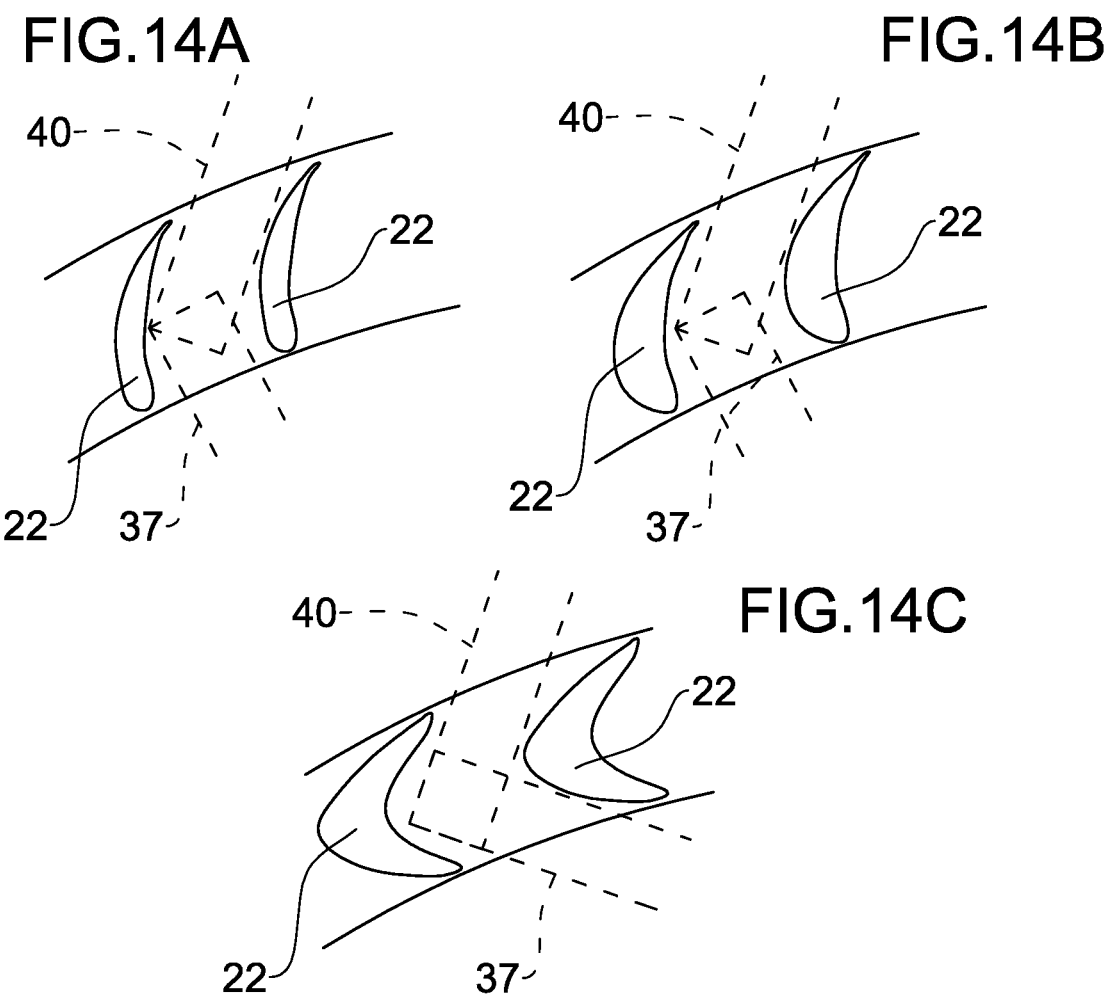

METHOD FOR MANUFACTURING BLADED RINGS FOR RADIAL TURBOMACHINES AND BLADED RING OBTAINED BY THIS METHOD

FIELD OF THE INVENTION

The object of the present invention is a method for the manufacturing of bladed rings for radial turbomachines and a bladed ring obtained by means of said method.

By radial turbomachine is meant a turbomachine in which the flow of fluid with which it exchanges energy is directed in a radial direction for at least a part of the path followed in the turbomachine itself. The radial part of the path is delimited by at least a bladed ring through which the fluid moves prevalently along a radial direction relative to a rotation axis of the impeller of the turbomachine.

A "bladed ring" comprises a plurality of blades arranged equally spaced from a central axis and joined to one another by two or more concentric rings axially spaced from one another. The blades extend between two rings with their leading and trailing edges parallel or substantially parallel to the central axis. The bladed ring can have both a stator function (it is fixed with respect to a casing of the turbomachine and the blades are stator blades) and a rotor function (i.e. it rotates and its blades are rotor blades and therefore the central axis is the rotation axis). The present invention applies both to centrifugal radial turbomachines (out-flow) and centripetal radial turbomachines (in-flow). The present invention is applied both to drive turbomachines (turbines) and work turbomachines (compressors). Preferably but not exclusively, the present invention relates to expansion turbines. Preferably but not exclusively, the present invention relates to expansion turbines for production of electrical and/or mechanical energy. Preferably but not exclusively, the present invention relates to expansion turbines used in apparatuses for the production of energy which exploit geothermal sources, preferably using the Rankine water-steam cycle or the organic Rankine cycle (ORC).

BACKGROUND OF THE INVENTION

Published document U.S. Pat. No. 911,663 illustrates a method for producing series of blades for gas turbines, in particular of the radial type, which first envisages to join ends of the slim metal-strip blades and then to join the slim metal-strip blades to sturdy stiffening rings. The metal strips are first realised as straight strips provided with holes in which the ends of the blades are inserted and fixed. The strips are then arc- or circumference-shaped. The ends of the blades are welded to the strips by means of a torch blowpipe or a voltaic arc. The metal strips are rigidly fixed to the stiffening rings, for example by welding or bending. The projecting ends of the blades and other superfluous portions are then removed by mechanical machining.

Published document U.S. Pat. No. 933,379 illustrates a method for realising bladed rings for turbines, in which the rings are formed by a series of blades fixed to connecting strips and stiffening rings are provided for the connecting strips. Ends of the blades are inserted in slots fashioned in the strips and fixed thereto by means of welding using a blowpipe or a voltaic arc. The strips are first made as straight strips provided with the slots and are then fashioned into an arc or circumference shape. The method includes forming, on the strips and rings, projections/recesses configured for being connected to one another by upsetting of the edges of said projections or by deformation of a further interposed connecting member. The further connecting member can be a drawn wire, mild steel, brass, copper, nickel.

Published document U.S. Pat. No. 968,862 illustrates a method for realising bladed rings for turbines. Ends of the blades are inserted in passages fashioned in rings and then welded thereto. The bladed rings can be jointed to support rings for example by means of dovetail joints.

Published document U.S. Pat. No. 1,831,104 illustrates a method for construction of bladed rings constituted by two or more connecting rings axially spaced and by a plurality of interposed blades. Each of the connecting rings has a plurality of grooves, for example dovetailed, axially open towards the inside and extending from a radially internal surface in a radial direction. Such grooves partially extend through the material of the respective connecting ring, to form fixing pouches for the blades. Each of the blades has, at its ends, heads, for example dovetailed, which are inserted in the above-mentioned pouches on a radially internal side of the connecting rings. The heads are fixed in the grooves by bending a flange against the heads.

Published document WO 2014/064567, in the name of the same Applicant, illustrates a method for constructing stages of centrifugal radial turbines, in which the first and the second ends of each blade are connected to two respective support rings, joining, by laser welding, at least a first semi-portion belonging to the respective end of the blade and a respective second semi-portion belonging to the respective support ring, in order to form an elastically yielding connecting portion along a radial direction, and placing at least an endrun portion belonging to the end of the blade facing, along the radial direction, at least a stop element of the respective support ring. The elastically yielding connecting portion enables the endrun portion to come into contact with the stop element when the stage is subjected to workloads of the turbine.

Document U.S. Pat. No. 6,942,460 illustrates an impeller for a radial turbine comprising a circular main disc provided with a plurality of blades, each of which has a positive-pressure face and a negative-pressure face. A peripheral edge of the main disc between the positive-pressure face of a blade and the negative-pressure face of the adjacent blade is cut off so as to define an indentation.

Published document GB 652 591 illustrates a bladed ring for radial turbines, in which the blades can be made in a single piece with a respective reinforcement ring.

SUMMARY

In this context, the Applicant has perceived the need to improve the quality and constructive precision of the bladed rings of known type and therefore the reliability and efficiency of the turbomachine in which they are installed.

The Applicant has in fact noted that bladed rings such as the ones described in document U.S. Pat. No. 911,663 and U.S. Pat. No. 933,379, i.e. made of a plurality of parts that are then assembled, cannot be geometrically very precise, as during the assembly of the single parts, those parts are subjected to mechanical stresses due to mechanical machining and/or high temperatures, which modify the shape thereof and necessarily require a final re-machining.

For example, in U.S. Pat. No. 911,663 the metal strips intended to connect the blade to the stiffening rings are welded to the blade by blowpipe or voltaic arc. The joint between the metal strips and the stiffening rings is also carried out, in an embodiment, by welding using a blowpipe or voltaic arc. The heat applied in this way can alter the mechanical characteristics and the shape of the blades and/or the position/orientation thereof with respect to the strip to which they are connected. Following the connection with the blades, the strips are further machined to remove excess material. In a different embodiment, described in U.S. Pat. No. 911,663, the metal strips are rigidly fixed to the stiffening rings by bending/deformation of parts thereof. These machine workings can also alter the geometric design characteristics.

In U.S. Pat. No. 933,379, as well as the joining of the blades to the strips by welding with blowpipe or voltaic arc, also the upsetting of the edges of the projections and deformation of the further connecting member do not enable precisely controlling of the final geometric characteristics of the bladed ring thus obtained.

The Applicant has also noted that the connecting systems such as those just mentioned or the one described in document U.S. Pat. No. 1,831,104 are poorly able to withstand the heat gradients that occur, for example, in start-up transients. During these transients, the high-temperature steam strikes only the blades and some portions of the casing of the turbomachine. The heat then diffuses from the parts struck by the steam towards the other parts of the turbomachine. The blades and the rings expand differently and the assembly tends to lose its strength. This phenomenon is more critical in rotor bladed rings which are subjected to centrifugal force.

The Applicant has also noted that in those solutions that envisage the realisation of rotor bladed rings by direct joining between the blades and the support rings, as in WO 2014/064567 and U.S. Pat. No. 968,862 (i.e. without intermediate connecting metal strips or rings), it is more difficult to separate the stresses due to the centrifugal force from those due to the weight of the blades. In particular, the Applicant has noted that the internal circumferential stresses due to centrifugal force have their points of maximum concentration at the connecting zones with the blades, in particular at the outlet edges thereof. These zones of maximum concentration of the stresses are structurally dangerous.

The Applicant therefore pursues the following objects:
providing a method for construction of bladed rings which enables to improve the quality and constructive precision of the bladed rings and therefore the reliability and efficiency of the turbomachine in which they are installed;
providing a method for manufacturing bladed rings that is rapid and relatively simple;
providing a bladed ring in which the concentrations of the stresses are limited or in any case not critical.

The Applicant has found that the above-indicated and other objectives can be attained by realising a solid bladed ring, i.e. by removal of material by a starting block, in which said starting block is preferably annular.

In particular, the stated and other objectives are substantially attained by a method for construction of bladed rings for radial turbomachines, by a bladed ring and by a radial turbomachine according to one or more of the appended claims and/or according to one or more of the following aspects.

In the present description and the appended claims, with the adjective "axial" is meant a definition of a direction running parallel to a central axis of the bladed ring or the rotation ring "X-X" of the turbomachine. The adjective "radial" is meant as a definition of a direction directed in radius-fashion perpendicularly from the central axis of the bladed ring or rotation axis "X-X" of the turbomachine. The adjective "circumferential" is meant as a definition of directions tangential to circumferences coaxial to the central axis of the bladed ring or the rotation axis "X-X" of the turbomachine.

More specifically, according to an independent aspect, the present invention relates to a method for manufacturing bladed rings for radial turbomachines.

The method envisages preparing an annular block and roughing the annular block by removing material to define a first axial section, a second axial section, a third axial section and a fourth axial section, wherein the first axial section defines a reinforcement ring, wherein the third axial section defines a base ring.

The method includes roughing the second axial section by removing material to delimit a plurality of separate elements, wherein said separate elements axially connect the base ring to the reinforcement ring.

The method includes finishing each of the separate elements by removing material to provide said separate element with the shape of an airfoil blade, wherein a leading edge of said blade and a trailing edge of said blade develop substantially parallel to a central axis of the bladed ring.

In a preferred embodiment, the method further includes roughing the fourth axial section by removing material for delimiting an annular anchoring appendage of the base ring to a radial turbomachine.

According to a different independent aspect, the present invention relates to a bladed ring for radial turbomachines, comprising: a base ring; a reinforcement ring coaxial to the base ring and axially spaced from said base ring; a possible annular anchoring appendage of the base ring to a radial turbomachine; a plurality of blades which axially connect the base ring to the reinforcement ring, wherein a leading edge of each blade and a trailing edge of each blade develop substantially parallel to a central axis of the bladed ring; wherein the bladed ring is in a single piece, i.e. it is made of a starting block.

According to a different aspect, the present invention relates to a bladed ring according to the invention and/or realised according to the method of the invention.

According to a different aspect, the present invention relates to a stator or a rotor for radial turbomachines comprising at least a bladed ring according to the invention and/or realised according to the method of the invention.

According to a different aspect, the present invention relates to a radial turbomachine comprising at least a bladed ring according to the invention and/or realised according to the method of the invention.

The Applicant has verified that the manufacturing method of the present invention enables improving the quality and the precision of the bladed rings and therefore the reliability and the efficiency of the turbomachines in which they are installed. In fact, in this way the differences of the geometry of the finished ring with respect to the calculated design parameters are reduced or eliminated with respect to the bladed rings constituted by assembled single parts. There is in fact no risk that, during assembly, said parts can be deformed/altered and/or that the junctions are not correctly carried out.

The Applicant has also verified that the manufacturing method of the present invention can be almost totally automated and therefore made simpler, faster and safer.

The Applicant has further verified that the bladed rings made according to the present invention enable to prevent problems linked to heat stresses which occur in particular during the starting up of the turbomachine.

This method is applicable for blade profiles having different shapes, for bladed rings for both action and reaction stages with different degrees.

Further aspects of the invention are described in the following.

The material of the starting block is a metal, preferably stainless steel, for example: AISI 410, AISI 420, AISI 630 (17-4 PH), 13-4 PH.

The starting block is preferably forged.

Preferably, named—radial chord "Cr" of each blade—the difference between an external radius "Re" and an internal radius "Ri" of the bladed ring measured at the blades, a ratio between an axial length "L" of the bladed ring (and substantially also the starting block) and said radial chord "Cr" is greater than 2 (two).

The radial chord "Cr" is preferably comprised between about 2 mm and about 200 mm.

The external radius "Re" is preferably comprised between about 50 mm and about 500 mm.

The ratio between an axial length "Lp" of each blade and the radial chord "Cr" is preferably comprised between about 0.1 and about 20.

The ratio between an axial length "La1" of the reinforcement ring and the radial chord "Cr" is preferably comprised between about 0.1 and about 100.

The ratio between an axial length "La2" of the base ring and the radial chord "Cr" is preferably comprised between about 0.1 and about 100.

Roughing the annular block preferably comprises: lathing and/or milling said annular block. In this first roughing step, usually done by the above-mentioned lathing (but also by the above-mentioned milling or other processes), material is removed for obtaining a ring with the mentioned four different axial sections:
1. the reinforcement ring (first axial section), which is preferably finished in this step;
2. the ring from which the blades will be made (second axial section);
3. the base ring (third axial section), which is preferably finished in this step;
4. the ring (fourth axial section) from which the annular anchoring appendage will be made.

Preferably, roughing the second axial section comprises milling said second axial section. Preferably, roughing the second axial section comprises: making grooves in the second axial section. Preferably, said grooves are made radially from inside and/or from outside. Preferably, said grooves are blind and/or radial through grooves.

Said grooves are preferably radially made from inside and from outside for creating through openings, wherein two successive through openings delimit between them one of the separate elements.

Preferably, first blind grooves are made radially from inside or from outside and second grooves are made radially from outside or from inside to open the first blind grooves and to form the through openings.

Making grooves preferably comprises: moving a milling cutter along rectilinear directions.

In the roughing step of the blades, the material is preferably removed by making "grooves" having a simple geometry with linear movements of the milling cutter, i.e. without interpolations, for example by frontal or peripheral milling, with the purpose of removing the greatest quantity of material in the shortest time. The objective of this first roughing step of the blades is to obtain two rings (reinforcement ring and base ring) joined to one another by the separate elements (usually prismatic and of a same height) with a volume that is such as each to contain a final blade, or, in other terms, characterised by transversal sections containing the profile of the blade for each section. During this roughing step of the blades, it is preferably not necessary to take great account of the surface quality (roughness Ra usually greater than 0.8) and the precision (for example comprised between +/−0.05 mm and 2 mm).

Making grooves preferably comprises: arranging a milling cutter in a radially external position with respect to the second axial section; moving the milling cutter inwards up to engage it with the second axial section; then moving the milling cutter axially; then moving the milling cutter outwards so as to extract it from the second axial section. These steps are carried out one or more times for realising a radially external groove.

Making grooves preferably comprises: arranging a milling cutter in a radially internal position with respect to the second axial section; moving the milling cutter outwards up to engage it with the second axial section; then moving the milling cutter axially; then moving the milling cutter inwards so as to extract it from the second axial section. These steps are carried out one or more times for realising a radially internal groove.

Preferably, moving the milling cutter inwards and/or outwards comprises: orientating the milling cutter in a radial direction and displacing the milling cutter along said radial direction. Alternatively, moving the milling cutter inwards and/or outwards comprises: orientating the milling cutter in an oblique direction with respect to a radial direction and displacing the milling cutter along said oblique direction.

An advancement velocity of the milling cutter is preferably comprised between approximately 300 mm/min and approximately 12000 mm/min. A cutting depth of the milling cutter is preferably comprised between approximately 0.02 mm and approximately 15 mm. A tangential velocity of the milling cutter is preferably comprised between approximately 10 and approximately 150 m/min. A rotation velocity of the milling cutter is preferably comprised between approximately 200 RPM and approximately 40000 RPM. A torque of the milling cutter is preferably comprised between approximately 4 and approximately 1000 Nm. A velocity of the axes of the milling cutter is preferably comprised between 0 m/min and approximately 180 m/min.

Preferably, finishing each of the separate elements comprises: milling each of the separate elements. An advancement velocity of the milling cutter is preferably comprised between approximately 100 mm/min and approximately 8000 mm/min. A cutting depth is preferably comprised between approximately 0.005 mm and approximately 5 mm. A tangential velocity of the milling cutter is preferably comprised between approximately 60 m/min and approximately 200 m/min. A rotation velocity of the milling cutter is preferably comprised between approximately 1000 RPM and approximately 100000 RPM. A torque of the milling cutter is preferably comprised between approximately 2 Nm and approximately 1000 Nm. A velocity of the axes of the milling cutter is preferably comprised between 0 m/min and approximately 150 m/min.

Finishing each of the separate elements preferably comprises: subjecting each of the separate elements to electrical discharge machining. Preferably, subjecting each of the separate elements to electrical discharge machining comprises: applying to each of the separate elements at least two electrodes counter-shaped to the airfoil to be obtained. At least a first electrode is preferably applied radially from inside and at least a second electrode is applied radially from outside. A working/peak current of the electrodes is preferably comprised between approximately 40 A and approximately 800 A.

Axial speed=15 m/min

X, y, z axes resolution=0.05 μm

An advancement velocity of each electrode is preferably comprised between approximately 10 mm/min and approximately 1000 mm/min.

During the blade finishing step material is removed for obtaining the final blade, for example by means of frontal milling, for example with a spherical milling cutter, and/or by electrical discharge machining. The aim is to remove the greatest quantity of material in the shortest time taking into account the surface quality (roughness Ra usually comprised between 0.02 and 32) and the precision (for example comprised between +/−0.01 mm and +/−0.5 mm).

Roughing the fourth axial section preferably comprises lathing or reaming the fourth axial section.

Roughing the fourth axial section preferably comprises: obtaining an elastically yielding ring and a connecting foot. The elastically yielding ring is directly connected to the base ring and the connecting foot is positioned at an end of the elastically yielding ring. The elastically yielding ring enables a radial deformation thereof when subjected to loads (centrifugal force, temperature) of the turbomachine.

During this step, the fourth axial section is machined to fashion both the elastically yielding ring for connecting the base ring and the connecting foot and the foot connecting the elastically yielding ring to the turbomachine, in particular to a rotor disc of the turbomachine. Usually this step includes lathing or reaming and other machining according to the type of the connecting foot.

The ratio between an axial length "Le" of the elastically yielding ring and the radial chord "Cr" is preferably comprised between about 0.1 and about 200.

The ratio between an axial length "Lg" of the connecting foot and the radial chord "Cr" is preferably comprised between about 0.01 and about 10.

The ratio between a thickness "s" of the elastically yielding ring and the radial chord "Cr" is preferably comprised between about 1/100 and about 1.

The blades are preferably polished following the finishing. The step of polishing the blades enables to further reduce the surface roughness and in some cases to remove a small layer of material so as to eliminate any machining micro-defects of the preceding steps.

Preferably, a fillet is made between each blade and the reinforcement ring and between each blade and the base ring. This detail enables to reduce the stresses in proximity of the blade trailing edge. The fillet can have a circular profile or, to further improve the stress situation, the fillet can have an elliptical profile.

Preferably, a circumferential groove is made on the base ring and/or on the base ring in proximity of the edges of the trailing edges of the blades. This circumferential groove delimits an annular wall. The reinforcement ring and/or the base ring have the circumferential groove located in proximity of the trailing edges of the blades, in which said circumferential groove delimits an annular wall.

The circumferential groove is preferably afforded on a radially external surface of the base ring and/or the reinforcement ring.

The ratio between a radial depth "d" of the circumferential groove and the radial chord "Cr" is preferably comprised between about 0.1 and about 0.9.

The ratio between a width "w" of the circumferential groove and the radial depth "d" is preferably comprised between about 0.1 and about 2.

The ratio between a thickness "t" of the circumferential annular wall and the width "w" is preferably comprised between about 0.1 and about 10.

The bladed ring preferably has a circumferential groove on the base ring and/or on the reinforcement ring located in proximity of the trailing edges of the blades, in which said circumferential groove delimits an annular wall, wherein a terminal edge of said annular wall has a wavy shape, wherein crests of said edge are positioned at the trailing edges of the blades.

Preferably, it is envisaged to give a wavy shape to a terminal edge of said annular wall, wherein crests of said edge are placed at the trailing edges of the blades. The annular wall therefore has a terminal edge with a wavy shape, wherein the crests of said terminal edge are placed at the trailing edges of the blades.

In other words, a radial unloading is carried out (circumferential groove) on the base ring and/or the reinforcement ring and the remaining ring (annular wall) is profiled about the blades in proximity of the trailing edge. This solution enables to further improve the localised stress status as it separates the stresses given by the flexion moments of the blade by the circumferential stresses generated by the rotation of the ring (base or reinforcement ring). In fact, by doing this, the remaining part of the ring unloaded in "waves" does not participate in the circumferential resistance to the rotation, i.e. does not suffer from the state of circumferential stress, opposing resistance only to the flexion moments produced by the blade. The result is a reduction in localised stress.

Further characteristics and advantages will more fully emerge from the detailed description of preferred but not exclusive embodiments of a bladed ring for radial turbomachines and a method for construction thereof according to the present invention.

DESCRIPTION OF THE DRAWINGS

This description will be set out below with reference to the attached drawings, provided solely for indicative and therefore non-limiting purposes, in which:

FIG. 12 illustrates a further machining step to remove material of the construction method according to the invention;

FIG. 13 illustrates a variant of the machining step of FIG. 12;

FIGS. 14A, 14B and 14C show variants of the machining step of FIG. 8.

DETAILED DESCRIPTION

Figure 1:
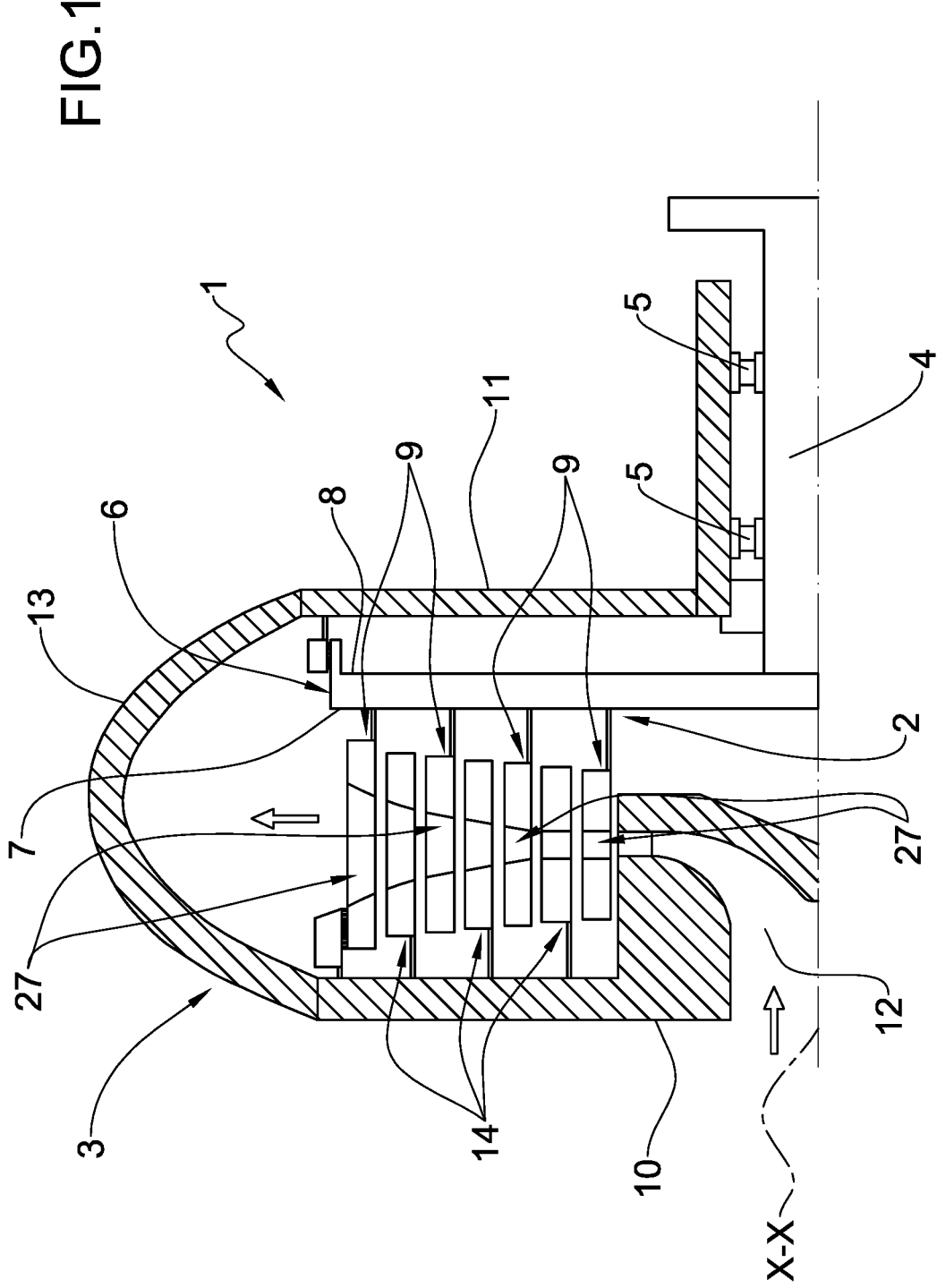
FIG. 1 shows a meridian section of a radial turbomachine comprising bladed rings, according to the present invention.

With reference to the above-mentioned figures, reference numeral 1 denotes in its entirety a radial turbomachine.

The radial turbomachine 1 illustrated in FIG. 1 is an expansion turbine of a radial centrifugal type with a single rotor 2. For example, the turbine 1 can be used in the sector of plants for generation of electrical energy of the Rankine cycle type, either organic Rankine Cycle (ORC) or water steam, which exploit geothermal resources as sources.

The turbine 1 comprises a fixed casing 3 in which the rotor 2 is housed so as to be able to rotate. To this end, the rotor 2 is rigidly connected to a shaft 4 which extends along a central axis "X-X" (which coincides with a rotation axis of the shaft 4 and the rotor 2) and is supported in the fixed casing 3 by appropriate bearings 5. The rotor 2 comprises a rotor disc 6 directly connected to the shaft 4 and provided with a front face 7 and an opposite rear face 8. The front face 7 projectingly bears a plurality of rotor bladed rings 9 that are concentric and coaxial to the central axis "X-X".

The fixed casing 3 comprises a front wall 10, located in front of the front face 7 of the rotor disc 6, and a rear wall 11, located in front of the rear face 8 of the rotor disc 6. The front wall 10 has an opening defining an axial inlet 12 for a work fluid. The axial inlet 12 is located at the central axis "X-X" and is circular and concentric to the axis "X-X". The fixed casing 3 further has a transit volute 13 of the work fluid located in a radially peripheral position external to the rotor 2 and in fluid communication with an outlet, not illustrated, from the fixed casing 3.

The front wall 10 projectingly bears a plurality of stator bladed rings 14 that are concentric and coaxial to the central axis "X-X". The stator bladed rings 14 extend internally of the casing 3 towards the rotor disc 6 and are radially alternated with the rotor bladed rings 9 to define a radial path of expansion of the work fluid which enters through the axial inlet 12 and expands moving radially away towards the periphery of the rotor disc 2 up to entering into the transit volute 13 and then exiting from the fixed casing 3 through said outlet, not illustrated.

The rotor bladed rings 9 and the stator bladed rings 14 are structurally similar to one another. In the following therefore a description will be made of the rotor bladed rings 9.

Figure 3:
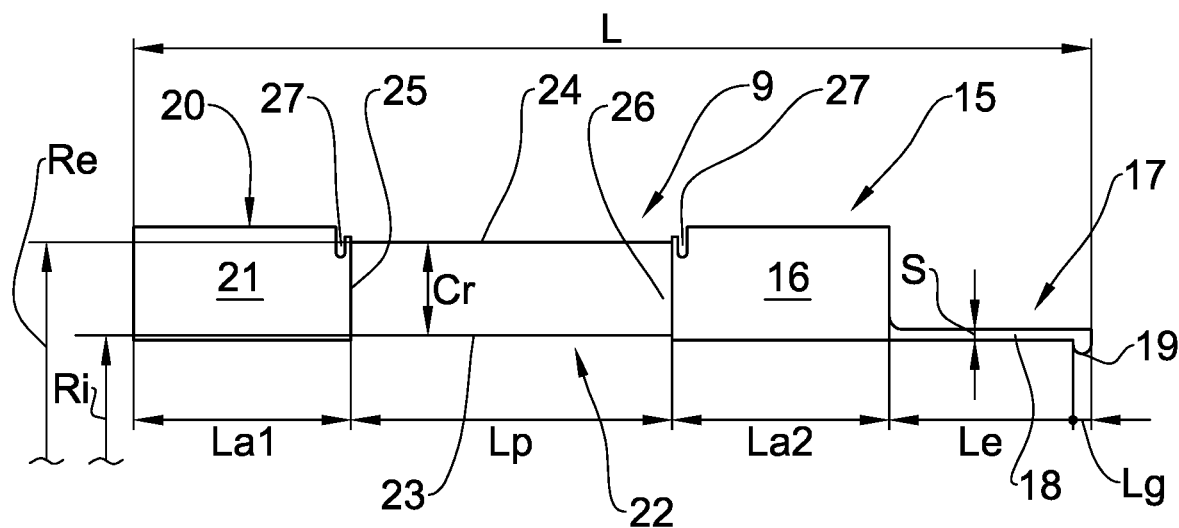
FIG. 3 is a section view along a radial and partial plane of the bladed ring of FIG. 2.
Figure 2:
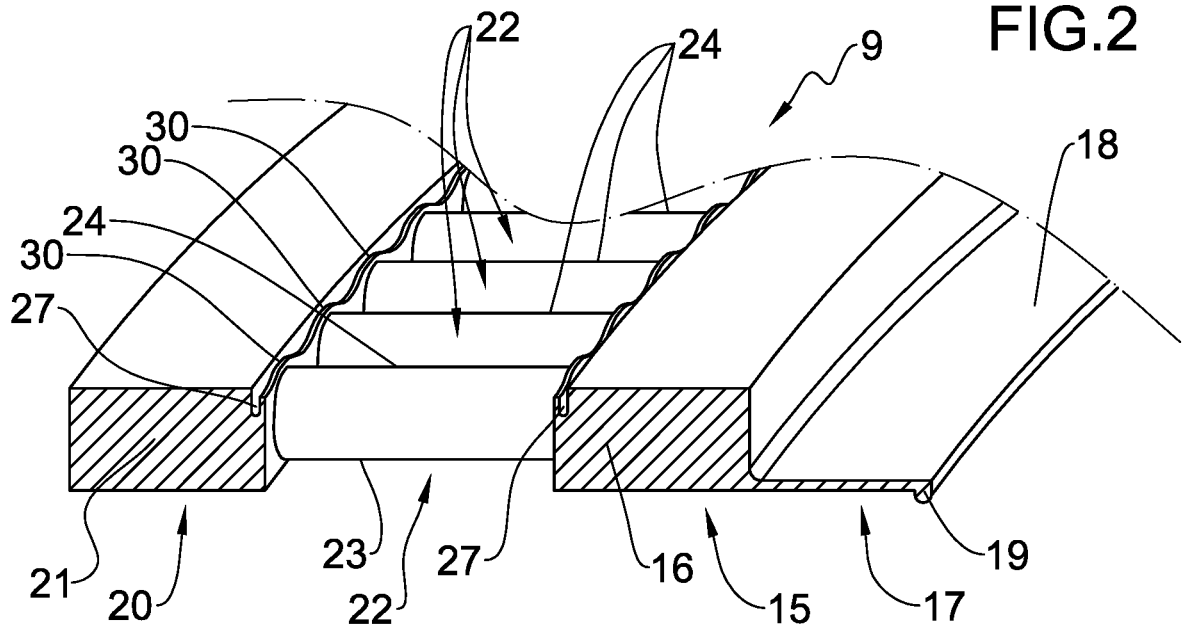
FIG. 2 is a partial cut-away perspective view of one of the bladed rings of FIG. 1.

With reference to FIGS. 2 and 3, the bladed ring 9 comprises a first support ring 15 or base ring destined to be anchored to the front face 7 of the rotor disc 6.

As can be observed in FIGS. 2 and 3, the base ring 15 has a first annular central body 16, which in the above-mentioned section is rectangular or square, from which an annular anchoring appendage 17 extends axially on one side and comprises an elastically yielding ring 18 which terminates with a connecting foot 19. The elastically yielding ring 18 is directly connected to the base ring 15 and the connecting foot 19 is positioned at an end of the elastically yielding ring 18 opposite the first annular central body 16. The elastically yielding ring 18 enables a radial deformation thereof when subjected to loads (centrifugal force, temperature) of the turbomachine when operating. The connecting foot 19 is configured for stably engaging in an appropriate seating, not illustrated, fashioned in the rotor 2. The bladed ring 9 comprises a second support ring 20 or reinforcement ring. FIG. 3 illustrates the section, in an axial plane, of the reinforcement ring 20. As can be observed, the second support ring 20 has a second annular body 21, which in the above-mentioned section is rectangular or square.

The bladed ring 9 comprises a plurality of blades 22 with an airfoil that extends between the base ring and the reinforcement ring 15, 20. The base ring and the reinforcement ring 15, 22 are coaxial and axially spaced from one another. Each blade 22 has a leading edge 23 and a trailing edge 24 parallel to the central axis "X-X" of the bladed ring 9. As the illustrated turbomachine 1 is a centrifugal radial turbine in which the work fluid moves radially towards the outside, the leading edge 23 of each blade 22 radially faces towards the inside, i.e. towards said central axis "X-X", and the trailing edge 24 is facing radially towards the outside.

The blades 22 are arranged equally spaced from the central axis "X-X" and circumferentially spaced by a constant pitch from one another. The blades 22 have a radial chord "Cr" defined by the difference between an external radius "Re" and an internal radius "Ri" of the bladed ring 9 measured at the blades 22 (FIG. 3). Each blade 22 has a first axial end 25 and a second axial end 26 that are opposite and respectively connected to the base ring 15 and the reinforcement ring 20 (FIG. 3).

Figure 4:
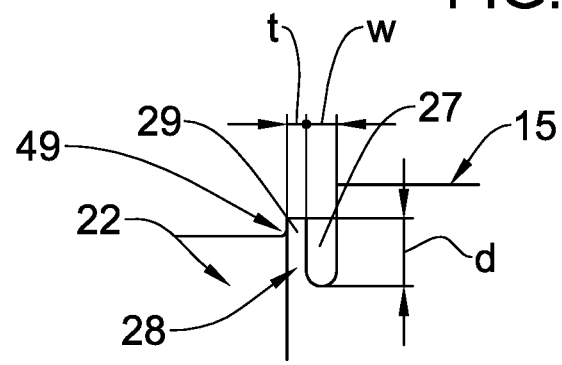
FIG. 4 is a larger-scale portion of FIG. 3.
Figure 5:
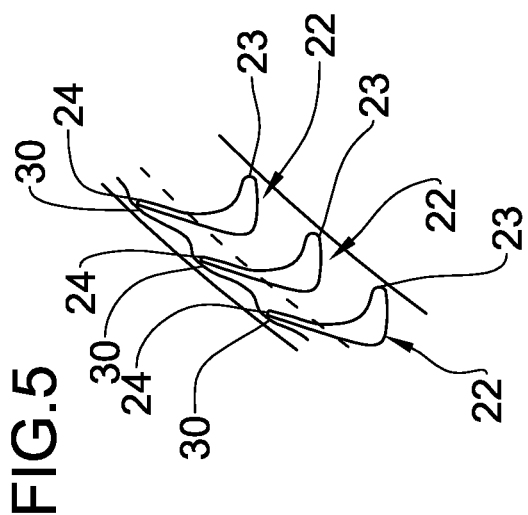
FIG. 5 is a section view of a portion along a perpendicular plane to a central axis of the bladed ring of FIGS. 2, 3 and 4.

A circumferential groove 27 is fashioned on a radially external face of both the base ring 15 and the reinforcement ring 27, which circumferential groove 27 is located in proximity of the blades 22 so as to delimit an annular wall 28 (FIG. 4). The annular wall 28 extends radially outwards and has a terminal edge 29 which has a wavy shape, wherein the crests 30 of said terminal edge 29 are positioned at the trailing edges 24 of the blades 22 (FIGS. 2 and 5).

By way of example, the radial chord "Cr" is about 10 mm. The ratio between an axial length "L" of the bladed ring 9 and said radial chord "Cr" is for example ten, so that the axial length "L" is about 100 mm. The ratio between an axial length "Lp" of each blade 22 and the radial chord "Cr" is, for example, five, so that said axial length "Lp" of each blade 22 is about 50 mm. The ratio between an axial length "La1" of the reinforcement ring 20 and the radial chord "Cr" is for example two, so that said axial length "La1" of the reinforcement ring 20 is about 20 mm. The ratio between an axial length "La2" of the base ring 15 and the radial chord "Cr" is for example two, so that the axial length "La2" of the base ring 15 is about 20 mm. The ratio between an axial length "Le" of the elastically yielding ring 18 and the radial chord "Cr" is for example about two, so that the axial length "Le" of the elastically yielding ring 18 is about 20 mm. The ratio between an axial length "Lg" of the elastically yielding ring 19 and the radial chord "Cr" is for example 0.5, so that the axial length "Lg" of the connecting foot 19 is about 5 mm. The ratio between a thickness "s" of the elastically yielding ring 18 and the radial chord "Cr" is for example about 0.125, so that said thickness "s" is about 1.25 mm. The ratio between a radial depth "d" of the circumferential groove 27 and the radial chord "Cr" is, for example, 0.5, so that the radial depth "d" is about 5 mm. The ratio between a width "w" of the circumferential groove 27 and the radial chord "Cr" is, for example, 0.15, so that said width "w" is about 1.5 mm. The ratio between a thickness "t" of the circumferential annular wall 28 and the radial chord "Cr" is for example about 0.08, so that said thickness "t" is about 0.8 mm.

Figure 6:
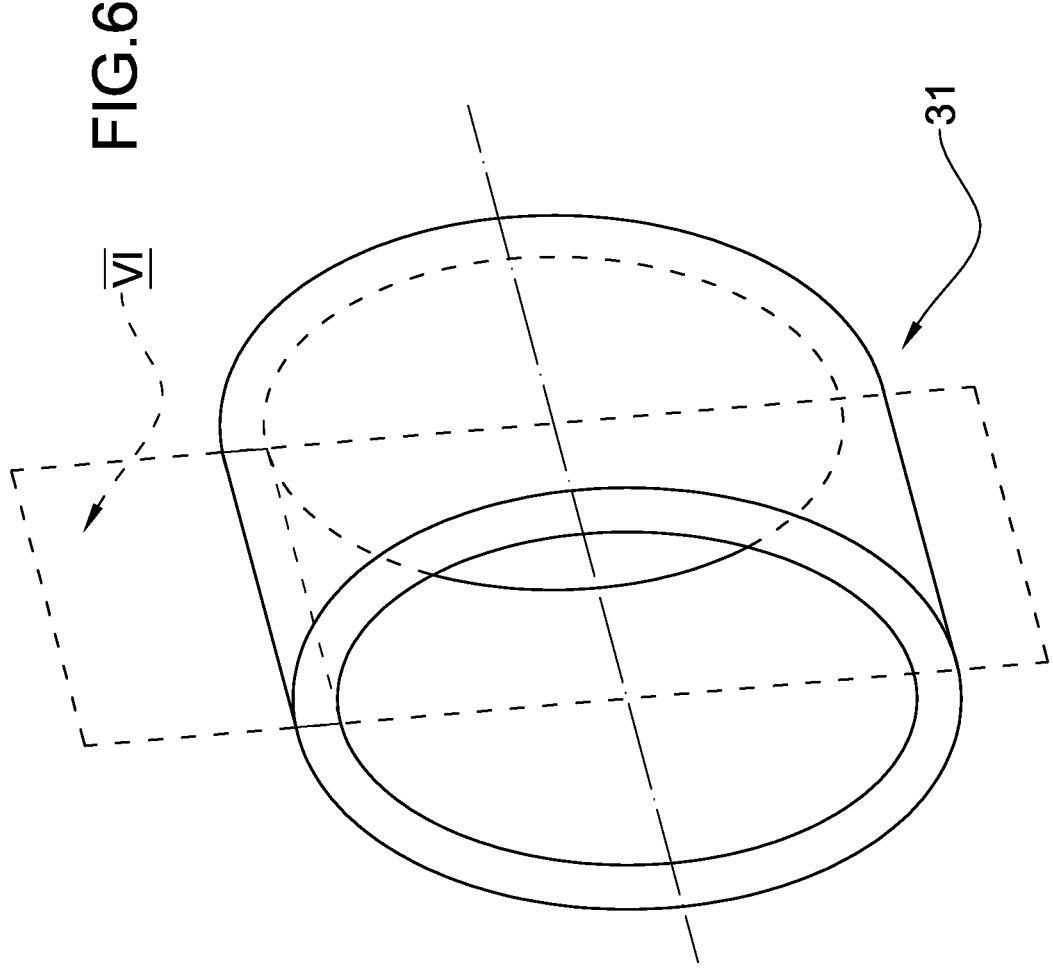
FIG. 6 is an annular block used for constructing the bladed ring of FIGS. 2-5.

The bladed ring 9 is in a single piece, i.e. is made of a starting annular block 31 (FIG. 6) made of metal obtained, for example, by forging.

Figure 7:
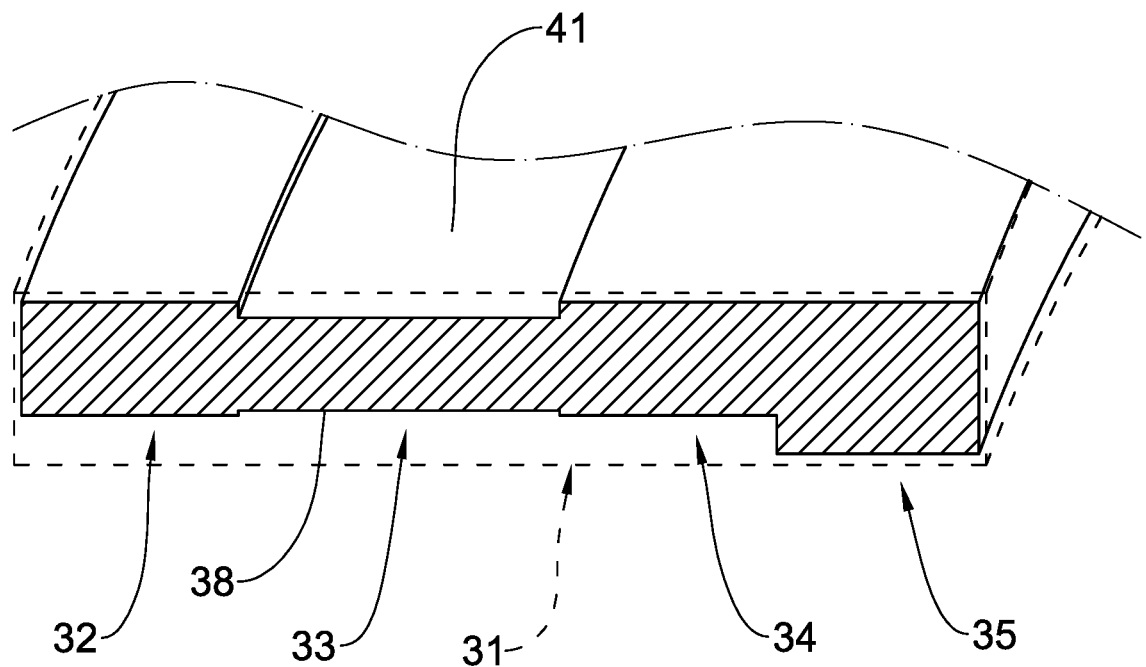
FIG. 7, in a broken line, illustrates a sectioned portion according to the plane VI of FIG. 6 of the annular block and, in a continuous line, the corresponding sectioned portion of the block after a first roughing.

According to the method for the construction of bladed rings for radial turbomachines of the invention, the starting annular block 31 is first roughed by removal of material (lathing or reaming) so as to define a first axial section 32, a second axial section 33, a third axial section 34 and a fourth axial section 35 (FIG. 7). The first axial section 32 and the second axial section 33, the third axial section 34 and the fourth axial section 35 are annular elements flanked in sequence one after another and forming a single body.

The first axial section 32 defines the reinforcement ring 20, which in this step is practically already finished. The blades 22 will be fashioned from the second axial section 33, as described in detail in the following. The third axial section 34 defines the base ring 15, which in this step is practically already finished. The elastically yielding ring 18 and the connecting foot 19 will be fashioned from the fourth axial section 35.

Figure 11:
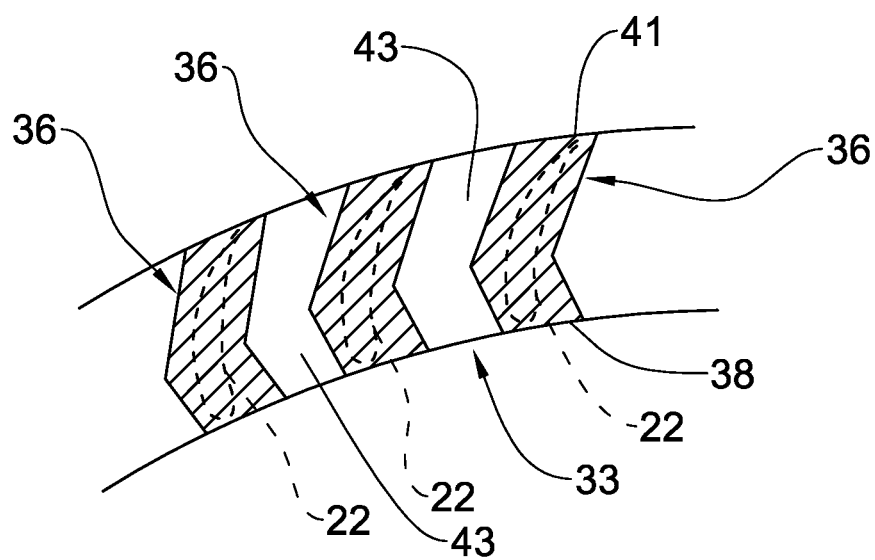
FIG. 11 is a section view of a plane perpendicular to a central axis following the machining of FIGS. 8, 9 and 10.

With the aim of forming the blades 22, the second axial section 33 is roughed by removing material so as to delimit a plurality of prismatic separate elements 36 which axially connect the base ring 15 to the reinforcement ring 20. Each of these prismatic separate elements 36 has a volume that is such as to each contain a final blade 22 or, in other terms, is characterised by transversal sections containing the aerodynamic profile of the blade 22 for each section. FIG. 11 illustrates a section of the second axial section 33 in a perpendicular plane to the central axis "X-X" after the definition of the plurality of prismatic separate elements 36. The transversal sections of said prismatic separate elements 36 are visible, as is the profile of the blade 22, in a broken line, which will be fashioned from each thereof.

Figure 8:
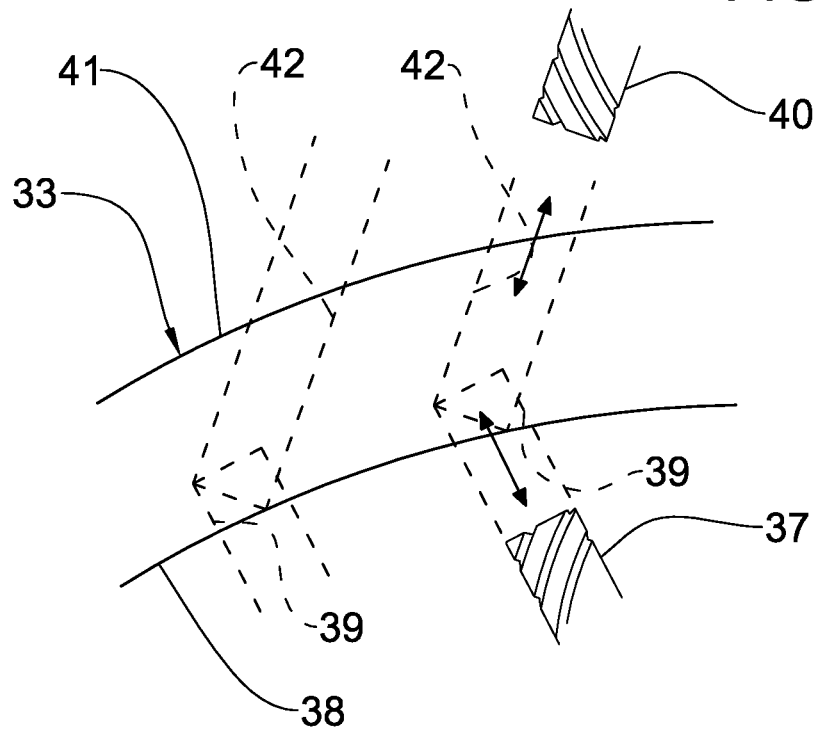
FIG. 8 illustrates a machining to remove material according to a construction method of the bladed rings according to the present invention.
Figure 9:
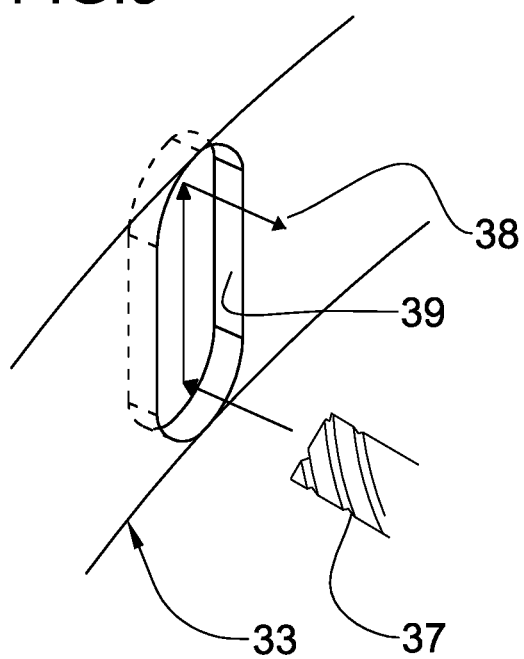
FIG. 9 illustrates a machining step of FIG. 8.
Figure 10:
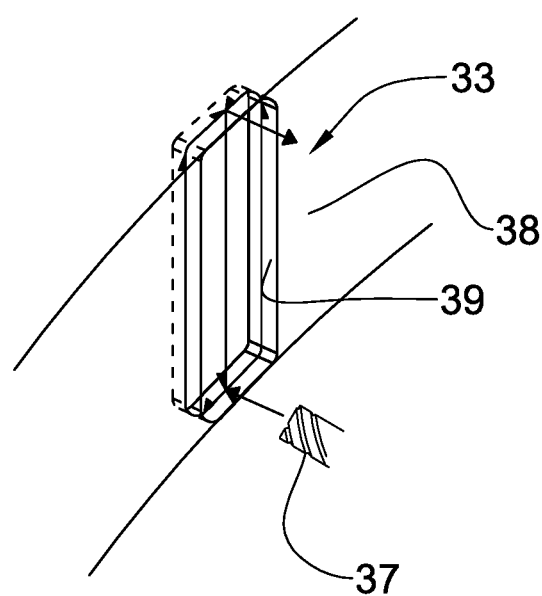
FIG. 10 illustrates a variant of the step of FIG. 9.

To define the prismatic separate elements 36, a milling cutter 37 is positioned in a radially internal position relative to the second axial section 33 and orientated along a radial direction (FIGS. 8, 9 and 10). The milling cutter 37 is radially moved towards the outside up to being engaged with a radially internal surface 38 of the second axial section 33. Thereafter the milling cutter 37 is displaced axially over the whole axial length "Lp" of the second axial section 33, i.e. of each blade 22, and then extracted from the second axial section 33. These steps are carried out one (as in FIG. 9) or more times (as in FIG. 10) for realising a radially internal groove 39 which is blind (i.e. which does not pass through the thickness of the second axial section 33). The milling cutter 37 is then displaced by one step along a circumferential direction in order to realise another groove 39. The radially internal grooves 39 are realised in a same number as the blades 22.

The same milling cutter 37 or a further milling cutter 40 is positioned in a radially external position relative to the second axial section 33 and orientated in an oblique direction with respect to a radial direction (FIG. 8). The further milling cutter 40 is moved towards the inside along said oblique direction up to being engaged with a radially external surface 41 of the second axial section 33. Thereafter the further milling cutter 40 is displaced axially over the whole axial length "Lp" of the second axial section 33, i.e. of each blade 22, and then extracted from the second axial section 33. These steps are carried out one or more times for realising a radially external groove 42 (FIG. 8). The milling cutter 40 is then displaced by one step along a circumferential direction in order to realise another groove 42. The radially external grooves 42 realised are in a same number as the blades 22. As can be observed in FIG. 8, each radially external groove 42 is located at a respective radially internal groove 40 and said two radially external groove 42 and radially external groove 40 co-penetrate so as to open a through opening or radial passage 43 (FIG. 11).

The milling cutters 37, 40 are moved along rectilinear directions, i.e. without complicated interpolations of movements. During this roughing step of the blades 22 the roughness Ra of the surfaces is usually greater than 0.8 and the precision is for example comprised between +/−0.05 mm and 2 mm.

The functioning parameters of the milling cutters 37, 40 are for example reported in following table 1.

TABLE 1

| Advancement velocity | 1000 mm/min |
|---|---|
| Cutting depth | 1 mm |
| Tangential velocity | 20 m/min |
| Rotation velocity | 5000 RPM |
| Torque | 50 Nm |
| Axial speed | 30 m/min |

The prismatic separate elements 36 are therefore machined removing material for forming the blades 22 with the desired airfoil profile and with a desired surface quality (roughness Ra for example comprised between 0.02 and 32) and precision (for example comprised between +/−0.01 mm and +/−0.5 mm).

According to a method, the finishing is carried out by frontal milling with a spherical milling cutter 44 (FIG. 12). The functioning parameters of the milling cutter 44 are for example reported in following table 2.

TABLE 2

| Advancement velocity | 500 mm/min |
|---|---|
| Cutting depth | 0.1 mm |
| Tangential velocity | 100 m/min |
| Rotation velocity | 20000 RPM |
| Torque | 5 Nm |
| Axial speed | 15 m/min |

Alternatively, finishing is carried out by electrical discharge machining (FIG. 13). For this purpose, two electrodes 45, 46 are applied to each of the separate elements 36, counter-shaped to the airfoil to be obtained. A first electrode 45 is applied radially from inside according to a radial direction and at least a second electrode 46 is applied radially from outside according to a radial direction. As can be noted, the first electrode 45 has a first operating surface 47 counter-shaped to the lower surface of the blade 22 and the second electrode 46 has a second operating surface 48 counter-shaped to the upper surface of the blade 22. The functioning parameters of the electrodes are for example reported in following table 3.

TABLE 3

| Working/peak current | 600 A |
|---|---|
| Advancement velocity | 20 mm/min |

During the finishing of the blades 22 described above, a fillet 49 is made between the first axial end 25 of each blade 22 and the reinforcement ring 20 and between the second axial end 26 of each blade 22 and the base ring 15. This fillet 49, visible in FIG. 4, can have a circular or elliptical profile and extends all about the blade 22 in the joining area between a surface of the blade 22 and the respective base ring 15 or reinforcement ring 20.

Following the finishing of the blades 22, the circumferential grooves 27 on the base ring 15 and reinforcement ring 20 and each annular wall 28 is fashioned about the blades 22 in proximity of the trailing edge 24 so as to give the terminal edge 29 of each annular wall 28 the above-described wavy shape.

At this point, the fourth axial section 35, which still has the shape of FIG. 7, is lathed or reamed to obtain the elastically yielding ring 18 and the connecting foot 19.

Lastly the blades 22 are polished, for example for further reducing the surface roughness and/or for eliminating any working micro-defects in the machining of the preceding steps.

The invention claimed is:

1. Method for manufacturing bladed rings for radial turbomachines, comprising:
    preparing an annular block;
    roughing the annular block by removing material to define a first axial section, a second axial section, a third axial section and a fourth axial section, wherein the first axial section defines a reinforcement ring, wherein the third axial section defines a base ring;
    roughing the second axial section by removing material to delimit a plurality of separate elements, wherein the separate elements axially connect the base ring to the reinforcement ring, wherein the separate elements are prismatic;
    finishing each of the separate elements by removing material to provide the separate elements with the shape of an airfoil blade, wherein a leading edge of the blade and a trailing edge of the blade develop parallel to a central axis of the bladed ring.

2. The method of claim 1, wherein finishing each of the separate elements comprises: subjecting each of the separate elements to electrical discharge machining.

3. The method of claim 2, wherein subjecting each of the separate elements to electrical discharge machining comprises: applying to each of the separate elements at least two electrodes counter-shaped to the airfoil to be obtained.

4. The method of claim 3, wherein at least a first electrode is applied radially from inside and at least a second electrode is applied radially from outside.

5. The method of claim 1, wherein roughing the second axial section comprises: making grooves in the second axial section to form through openings, wherein two subsequent through openings delimit between them one of the separate elements.

6. The method of claim 5, comprising making first blind grooves radially from inside or from outside and making second grooves radially from outside or from inside to open the first blind grooves and to form the through openings.

7. The method of claim 5, wherein making grooves comprises: moving a milling cutter along rectilinear directions.

8. The method of claim 1, comprising: making a circumferential groove on the base ring and/or on the reinforcement ring at the trailing edges of the blades, wherein the circumferential groove delimits an annular wall.

9. The method of claim 8, comprising giving to a terminal edge of the annular wall a wavy shape, wherein crests of the terminal edge are placed at the trailing edges of the blades.

10. The method of claim 8, wherein a ratio between a radial depth of the circumferential groove and a radial chord is comprised between about 0.1 and about 0.9; wherein a ratio between a width of the circumferential groove and a radial depth is comprised between about 0.1 and about 2; wherein a ratio between a thickness of the circumferential annular wall and a width is comprised between about 0.1 and about 10.

11. The method of claim 1, comprising: making a fillet between each blade and the reinforcement ring and between each blade and the base ring.

12. Method for manufacturing bladed rings for radial turbomachines, comprising:
    preparing an annular block;
    roughing the annular block by removing material to define a first axial section, a second axial section, a third axial section and a fourth axial section, wherein the first axial section defines a reinforcement ring, wherein the third axial section defines a base ring;
    roughing the second axial section by removing material to delimit a plurality of separate elements, wherein the separate elements axially connect the base ring to the reinforcement ring;
    finishing each of the separate elements by removing material to provide the separate elements with the shape of an airfoil blade, wherein a leading edge of the blade and a trailing edge of the blade develop substantially parallel to a central axis of the bladed ring,
    wherein finishing each of the separate elements comprises: subjecting each of the separate elements to electrical discharge machining, and
    wherein subjecting each of the separate elements to electrical discharge machining comprises: applying to each of the separate elements at least two electrodes counter-shaped to the airfoil to be obtained.

13. Method for manufacturing bladed rings for radial turbomachines, comprising:
    preparing an annular block;
    roughing the annular block by removing material to define a first axial section, a second axial section, a third axial section and a fourth axial section, wherein the first axial section defines a reinforcement ring, wherein the third axial section defines a base ring;
    roughing the second axial section by removing material to delimit a plurality of separate elements, wherein the separate elements axially connect the base ring to the reinforcement ring;
    finishing each of the separate elements by removing material to provide the separate elements with the shape of an airfoil blade, wherein a leading edge of the blade and a trailing edge of the blade develop substantially parallel to a central axis of the bladed ring;
    making a circumferential groove on the base ring and/or on the reinforcement ring at the trailing edges of the blades, wherein the circumferential groove delimits an annular wall.

* * * * *